United States Patent [19]

Kimizu

[11] Patent Number: 4,874,932
[45] Date of Patent: Oct. 17, 1989

[54] CARD AUTHORIZATION TERMINAL

[75] Inventor: Ryuichi Kimizu, Ootsu, Japan

[73] Assignee: Omron Tateisi Electronics Co., Kyoto, Japan

[21] Appl. No.: 247,348

[22] Filed: Sep. 21, 1988

[30] Foreign Application Priority Data

Sep. 26, 1987 [JP] Japan ................................ 62-241155
Sep. 26, 1987 [JP] Japan ................................ 62-241156
Oct. 9, 1987 [JP] Japan ................................ 62-255661

[51] Int. Cl.⁴ ............................................ G06F 15/30
[52] U.S. Cl. .................................... 235/379; 235/380; 902/5
[58] Field of Search ..................... 235/379, 380; 902/5

[56] References Cited

U.S. PATENT DOCUMENTS 4,408,203 10/1983 Campbell ............................. 902/5

Primary Examiner—Harold I. Pitts
Attorney, Agent, or Firm—Stevens, Davis, Miller & Mosher

[57] ABSTRACT

In a card authorization terminal for effecting card authorization processing for a large transaction amount of money with communications with a host computer but card pseudoauthorization processing for a small transaction amount of money without communications with the host computer, transaction data used for pseudoauthorization processing are once stored in a memory unit and then transmitted to the host computer during communications with the host computer for card authorization processing. Further, in the case of transactions of small amounts of money, only some transactions extracted at random are processed for card authorization.

13 Claims, 11 Drawing Sheets

| REFERENCE DATA-SETTING COMMAND | UPPER REFERENCE LIMIT | LOWER REFERENCE LIMIT |

Fig.10b

| RESPONSE DATA | UPPER REFERENCE LIMIT | LOWER REFERENCE LIMIT |

CARD AUTHORIZATION TERMINAL

BACKGROUND OF THE INVENTION

The present invention relates to a card authorization terminal, and more specifically to a card authorization terminal by which card authorization processing is effected with a host computer when an amount of money used for purchase (transaction amount) is more than a predetermined limit amount and card pseudoauthorization processing is effected without using the host computer when a amount of money used for purchase is the predetermined limit amount or less.

Recently, with the spread of credit cards, transaction processing apparatus have been put into practical use, which can effect card authorization processing by inquiring of a host computer about whether an amount of money used for purchase (amount of money of transaction) can be paid by a credit card (i.e. inspection about the validity of a card and so on) and by displaying the check results. These transaction processing apparatus are called card authorization terminals (CAT).

In the conventional credit card transaction processing, however, the card authorization processing is not effected for every credit card transaction. That is, only when an amount of money for customer's purchase is more than a predetermined amount, the card authorization processing is effected in such a way that transaction is permitted only when the host computer transmits an authorization result indicative of transaction permissibility to the card authorization terminal. On the other hand, when an amount of money for customer's purchase is the predetermined amount or less, transaction is effected without condition. In this case, an operation for each store determines whether an amount of money for customer's purchase is more than the predetermined amount or not.

In the prior-art card authorization terminals, however, since an amount of money for customer's purchase is compared with a predetermined amount by a operator, there exists a problem in that an operator permits transactions (purchase) by mistake without condition, in spite of an amount of money for purchase to be processed for card authorization, so that it is impossible to collect money to be paid. Further, there exists another problem in that a customer, who knows that card authorization processing is not effected when an amount of money for purchase is below a predetermined amount, purchases commodities by use of an improper card.

To overcome these problems, the applicant imagines a card authorization terminal provided with card authorization function in which card authorization is actually effected with inquiring of a host computer when an amount of money for purchase is large, and also with pseudoauthorization function such that an operator pretendently operates as if she or he performs actual card arthorization processing and the terminal does not inquire to a host computer but shows pseudoresponse data on the display without effecting actual card authorization processing when an amount of money for purchase is small.

In the above-mentioned card pseudoauthorization function, all processing data for pseudoauthorization such as card data, the amount of money, etc. are not actually transmitted to the host computer, it is necessary to send slips published in pseudoauthorization processing of the terminal to a credit company periodically in order that data are entered to the host computer. In this method, however, since transaction data are entered to the host computer being delayed and therefore the total amount of money for purchase is not accurate, there exists a problem in that it is impossible to accurately check a credit limit amount when cards are authorization by the host computer.

On the other hand, when the limit amount, on which whether the above-mentioned pseudoauthorization processing is to be effected or not is determined, can be read from the terminal device, there exists another criminal problem in that an operator who knows the limit amount purchases commodities whose price is below the limit amount with use of an unreal card number or the operator teaches this limit amount to a customer in order to make an illegal transaction in cooperation with the customer. Further, since a store manager knows this limit amount, there exists a problem in that he makes an illegal transaction with use of an unreal card, even if the limit amount is not readable.

SUMMARY OF THE INVENTION

With these problems in mind, therefore, the primary object of the present invention is to provide a card authorization terminal by which transaction data obtained when a pseudoauthorization is effected are stored temporarily and the stored pseudoauthorization data are transmitted at the same time to a host computer whenever an authorization processing is effected by the host computer.

Another object of the present invention is to provide a card authorization terminal by which some transactions whose amount of money is a limit amount (a reference data for pseudoauthorization processing) or less are extracted at random for inquiry of the host computer.

Still another object of the present invention is to provide a card authorization terminal in which an extraction rate, at which transactions whose amount of money is a limit amount or less are extracted, is not determined by an operator or a store manager.

To achieve the above-mentioned object, a card authorization terminal comprises (a) reading means for reading card date; (b) inputting means for inputting transaction amount date; (c) authorization processing means for transmitting card data read by said reading means and transaction amount data inputted by said inputting means to a host computer for authorization request and by receiving and displaying an authorization result transmitted from the host computer, when the transaction amount data inputted by said inputting means satisfies an authorization requirement condition; (d) pseudoauthorization processing means for effecting a pretended authorization processing by displaying a predetermined pseudoauthorization result without transmitting an authorization request to the host computer, when the transaction amount data inputted by said inputting means satisfies a pseudoauthorization condition; (e) storing means for storing card data read by said reading means and transaction amount data inputted by said inputting means whenever a pseudoauthorization processing is effected by said pseudoauthorization processing means; (f) detecting means for detecting whether card data and transaction amount data are stored in said storing means; and (g) controlling means for allowing said detecting means to detect whether card data and transaction amount data are stored in said storing means when an authorization processing is effected by said authorization processing means, and for transmitting data stored in said storing means to the host computer without interrupting communications, after an authorization processing by said authorization processing means, when data storage is detected by said detecting means.

According to the present invention, as described above, since data used for a pseudoauthorization processing are stored in the storing means for each pseudoauthorization processing and the data stored in the storing means are transmitted to the host computer collectively, without interrupting communications with the host computer, whenever an authorization processing by the host computer is effected, data used for the ordinary card authorization processing and data used for the pseudoauthorization processing are both updated in the host computer, thus permitting an accurate credit limit checking processing. As a result, it is possible to prevent a card owner from purchasing commodities beyond the credit limit amount by repeating credit card transactions of a small amount of money processed by pseudoauthorization, thus improving service for the customers. Further, since data used for pseudoauthorization processing are transmitted to the host computer collectively after the ordinary card authorization processing, without interrupting the transmission lines, it is possible to improve service for the stores without charging up the communication expenses to the store owners.

To achieve the above-mentioned object, a card authorization terminal for effecting an authorization processing by transmitting an authorization request to a host computer and by displaying an authorization result from the host computer when a transaction amount satisfies an authorization requirement condition and for effecting a pseudoauthorization processing by displaying a predetermined pseudoauthorization result without transmitting an authorization request to the host computer when a transaction amount satisfies a pseudoauthorization condition, according to the present invention, characterized by (a) inputting means for inputting transaction amount data; (b) discriminating means for discriminating whether a transaction amount data inputted from said inputting means is a limit amount or less and therefore an authorization processing by the host computer is not required; (c) forming means for forming a random number when said discriminating means determines that the transaction amount data inputted by said inputting means is the limit amount or less; (d) selecting means for selecting whether an authorization processing is requested to the host computer on the basis of a random number formed by said random number forming means; and (e) controlling means for allowing the host computer to effect an authorization processing without effecting pseudoauthorization processing, when said discriminating means determines that a transaction amount data inputted by said inputting means is the limit amount or less and further said selecting means selects an authorization processing by the host computer.

According to the present invention, as described above, when the customer's purchase amount of money is more than the limit amount, the authorization processing is effected by the host computer; and when the customer's purchase amount of money is the limit amount or less, a random number is formed and control selects whether an authorization request is to be transmitted to the host computer on the basis of the formed random number. When a authorization request to the host computer is not selected, a pseudoauthorization processing is effected. When an authorization request to the host computer is selected, an authorization processing is effected by the host computer even if the purchase amount of money is the limit amount or less. Therefore, since an authorization processing is effected by the host computer for the purchase amount of money of the limit amount or less, it is impossible to use a card illegally to purchase commodities of a small amount of money. Accordingly, it is possible to prevent an operator from processing a purchase on the basis of an unreal card number or from purchasing commodities by use of an illegal card in cooperation with a customer.

Further, since it is possible to prevent transactions based upon illegal cards, loss in card credit companies can be reduced and further the chance that an approval of card handing in store is cancelled due to occurrence of criminal acts related to credit cards can be reduced.

To achieve the above-mentioned objects, a card authorization terminal for effecting an actual authorization processing, in communications with a host computer, for small transaction amount of money of an authorization processing limit or less which is extracted at random in accordance with a predetermined extraction rate, and for effecting a pseudoauthorization processing, without communication with the host computer, for transactions not extracted is characterized by (a) means for detecting information related to the extraction rate from data received from the host computer via a transmission line; and (b) means for automatically updating the extraction rate on the basis of information detected by said detecting means, whereby the extraction rates can be determined via the transmission line only from outside.

According to the present invention, as described above, since the information related to the extraction rate indicative of the reference of whether transactions are processed as actual authorization or pseudoauthorization is given only from the host computer via the transmission line, it is possible to perfectly disable store's participation about the above-mentioned information.

That is, since data related to the extraction rate are not at all known at the store side, it is possible to disable illegal card transactions on the basis of the pseudoauthorization processing.

In other words it is possible to prevent illegal card transaction processing by the store operators and manager or the store from being damaged by the operator due to illegal sales processings based upon modified extraction rates, thus reducing loss in card companies.

In addition, since the information related to the extraction rate can be adjusted for each store in accordance with the evaluation degree of transaction credit determined when seen from the card company; that is, since the frequency of actual authorization processing can be controlled, it is possible to effectively use the host computer by reducing the frequency of card authorization inquiries.

Further, it is possible to continuously check the credit evaluation degree of each store on the basis of the proportion of actual authorization processing determined for each store, erroneous card processing, the number of card-related crimes, etc., thus reducing the chances of criminal transactions based upon credit cards.

DETAILED DESCRIPTION OF THE PREFERRED EMBODIMENTS

Figure 1:
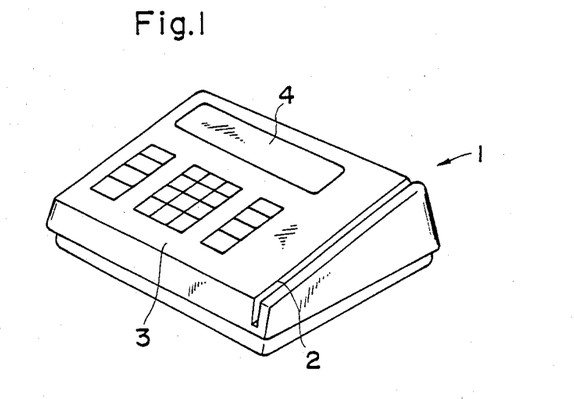
FIG. 1 is an outside perspective view showing an embodiment of the card authorization terminal of the present invention.

FIG. 1 is a perspective view of an embodiment of the present invention. In the drawing, a card authorization terminal 1 (referred to as CAT, hereinafter) is provided with a card reader 2 (its manual scanning groove is shown), a keyboard 3 and a display device 4. Further, the CAT 1 is connected to host installations (host computers) (not shown) via a telephone line network. The card reader 2 reads card data from a card. As this card reader 2, an automatic scanning type can also be adapted, as well as manual scanning type. Cards used for the CAT are generally credit cards; however, cash cards (or debit cards) can be used. The card data are a card number, a customer's account number, etc. The keyboard 3 is provided with keys, for example, for inputting an amount of money, as described later. The display device 4 displays data inputted by the keyboard 3 and the results of authorization processing. There exist two kinds of the results. One is an actual authorization response data transmitted from the host computer, while the other is a pseudoauthorization response data not dependent upon the host computer. The actual authorization response data from the host computer is response data actually responded by the host computer in response to an authorization request from the CAT 1. On the other hand, the pseudoauthorization response data is pseudoresponse data previously stored in a memory unit of the CAT 1 (these are not response data from the host computer). In this embodiment, the following operation is referred to as a pseudoauthorization processing operation; when card data are read by the card reader 2; an amount of money data is inputted by the keyboard 3; and a card company is selected by telephone dialing, a predetermined pseudoauthorization result is displayed on the display device 4 without transmitting an authorization request to the host computer.

The actual authorization processing by the host computer is executed when an amount of money for customer's purchase (transaction amount) is more than a predetermined limit, while the pseudoauthorization processing is executed when an amount of money for customer's purchase is the predetermined limit or less. The above pseudoauthorization response data are substantially the same on the display device as the actual authorization response data, so that it is possible to allow the customer and operator to recognize that an actual authorization processing is executed even in a pseudoauthorization processing. As described above, since it appears that all the credit transactions with use of cards are effected after authorization processing irrespective of the amount of money for customer's purchase, it is possible to allow the operator and the customer to recognize that there exists no possibility of using cards by illegal operation, thus previously preventing crimes related to cards.

Figure 2:
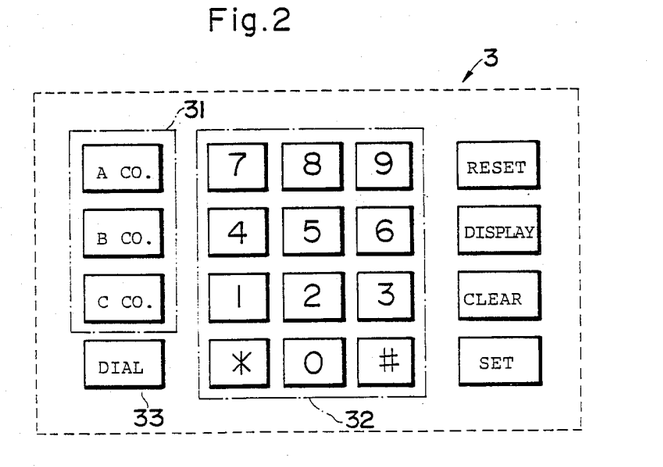
FIG. 2 is a view for assistance in explaining a key arrangement of a keyboard shown in FIG. 1.

FIG. 2 shows a key arrangement of the keyboard 3 shown in FIG. 1. In FIG. 2, the keyboard 3 is provided with card company selecting keys 31 for selecting a credit card company, numeral keys 32 for entering an amount of money, etc., and a dial key 33 for calling a host computer.

Figure 3:
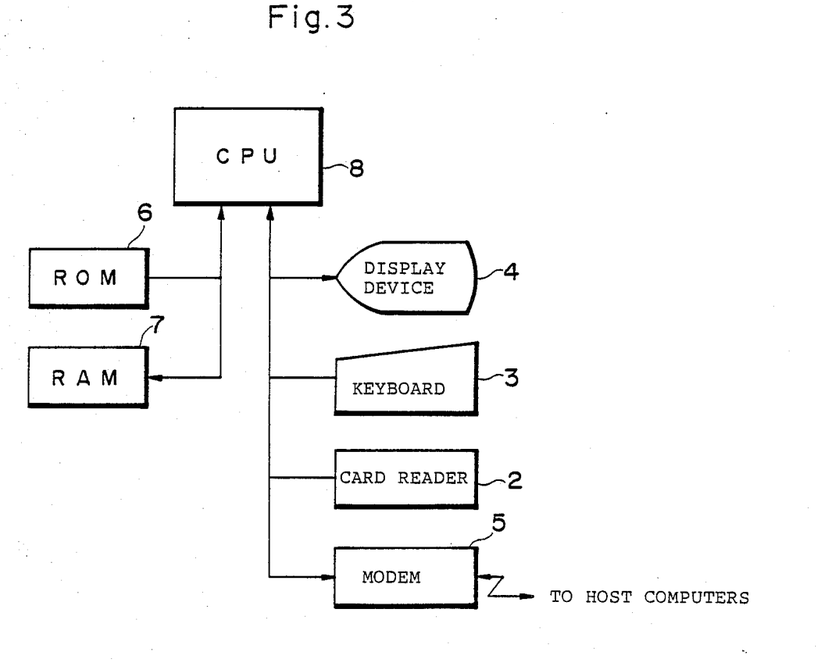
FIG. 3 is a schematic block diagram showing an electric configuration of the card authorization terminal shown is FIG. 1.
Figure 5A:
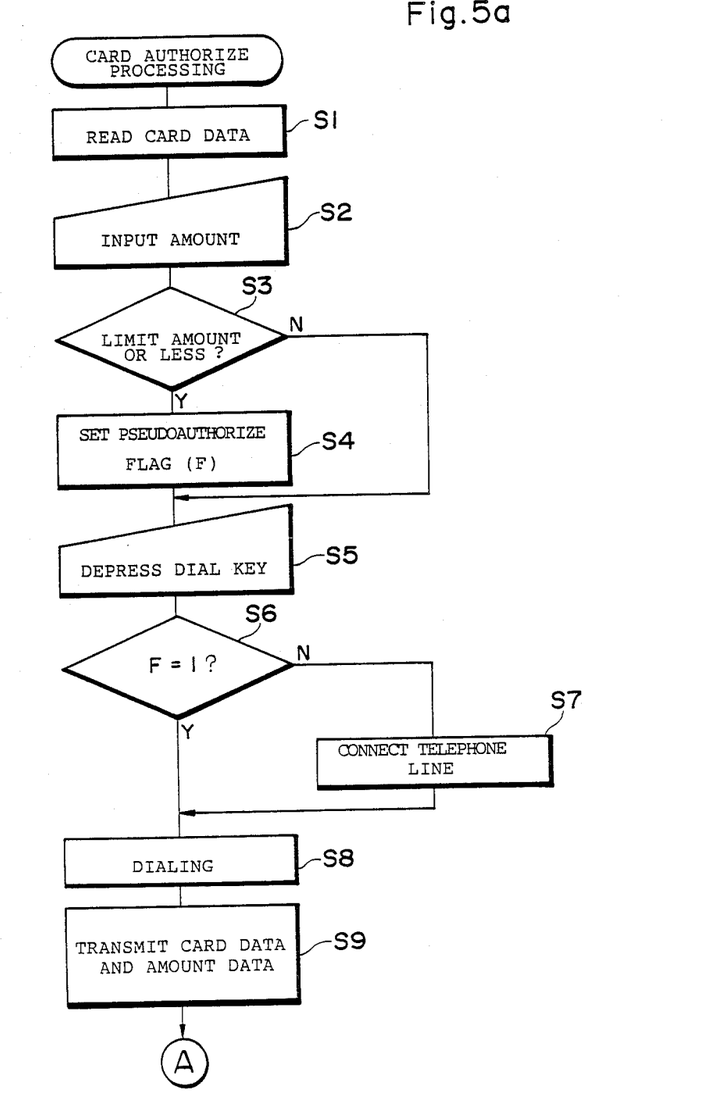
FIGS. 5a and 5b are flowcharts for assistance in explaining the operation of an embodiment of the present invention.
Figure 5B:
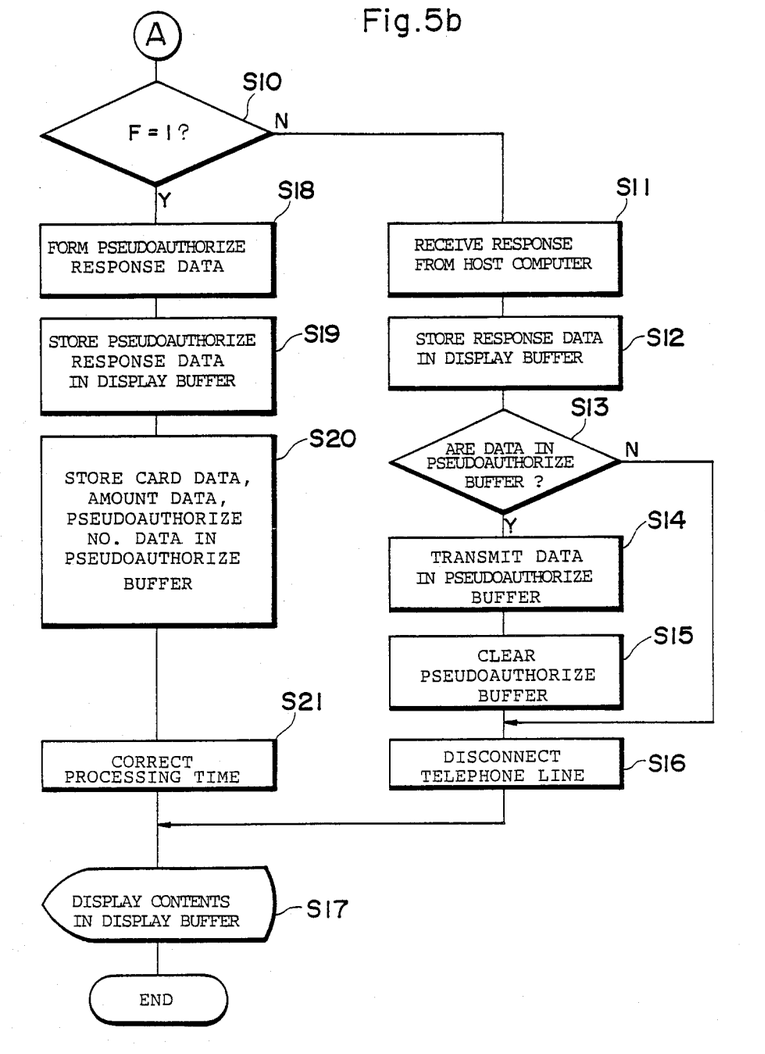
Figure 6:
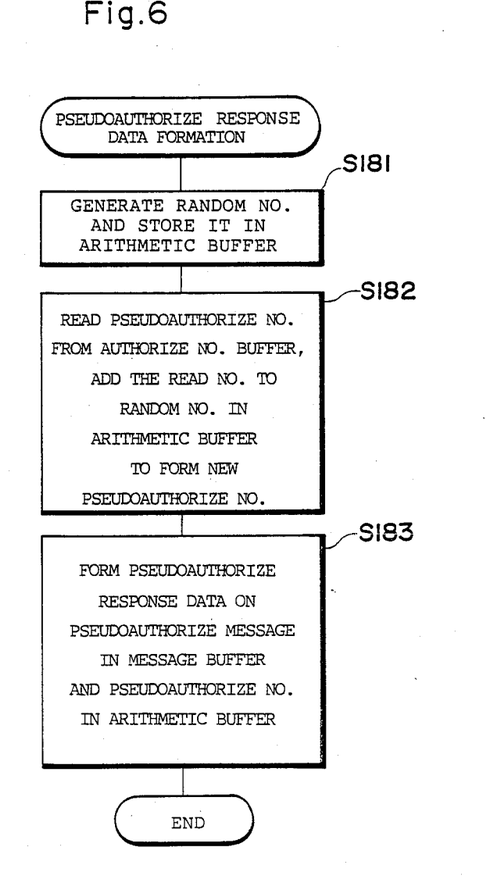
FIG. 6 is a flowchart for assistance in explaining a pseudoauthorization data forming processing.

FIG. 3 is a schematic block diagram showing the CAT 1 shown in FIG. 1. In FIG. 3, the CAT 1 is provided with a CPU 8 to which the card reader 2, the keyboard 3, the display device 4, a MODEM 5, a ROM 6, a RAM 7, etc. are connected. The MODEM 5 serves to transmit data between the CPU 8 and the host computers by modulating or demodulating signals transmitted through a telephone line network. In the ROM 6, operation programs of the CPU 8 represented by flowcharts as shown in FIGS. 5a, 5b and 6 are stored. In the RAM 7, there are areas where authorization information as shown in FIG. 4 is stored.

Figure 4:
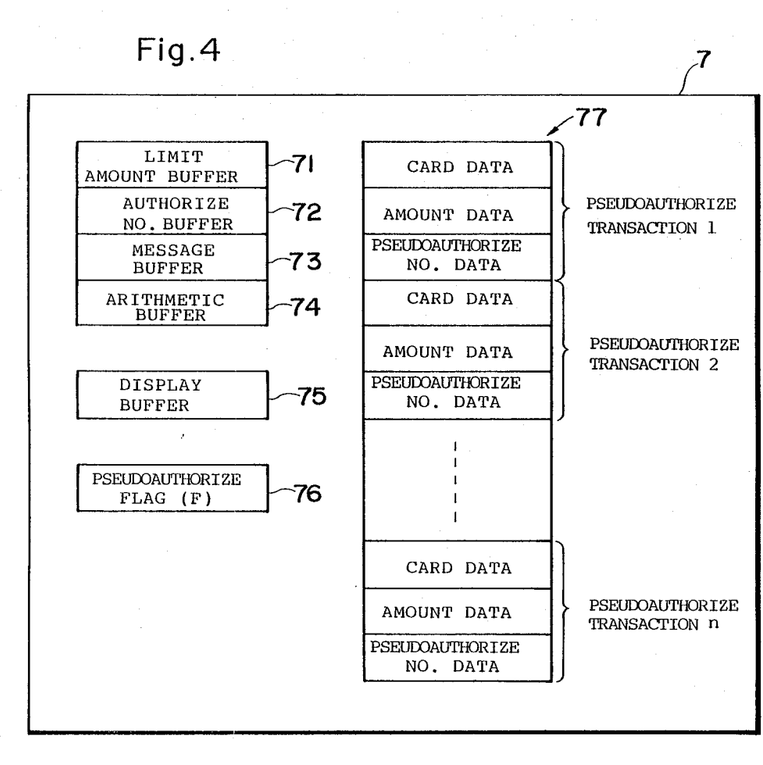
FIG. 4 is a view for assistance in explaining a memory configuration of a RAM shown in FIG. 3.

FIG. 4 is a view for assistance in explaining the memory configuration of the RAM 7 shown in FIG. 3. In FIG. 4, the RAM 7 is provided with a limit amount buffer (memory area) 71, an authorization number buffer 72, a message buffer 73, an arithmetic buffer 74, a display buffer 75, a pseudoauthorization processing flag storing area 76, and a pseudoauthorization buffer 77. The limit amount buffer 71 stores an authorization processing limit amount data based on which it is discriminated whether pseudoauthorization processing is executed or not. This limit amount data can be determined through the keyboard 3. The authorization number buffer 72 stores pseudoauthorization number data of the preceding pseudoauthorization. This pseudoauthorization number is a number formed within the CAT 1, which corresponds to an authorization number formed whenever the host computer executes an authorization processing. The message buffer 73 stores a pseudoauthorization message. This pseudoauthorization message is a previously determined message, which corresponds to an authorization message transmitted from the host computer. This pseudoauthorization message can be determined through the keyboard 3, for instance. The arithmetic buffer 74 is used to calculate a pseudoauthorization number currently formed. The display buffer 75 stores data displayed on the display device 4. The pseudoauthorization processing flag storing area 76 stores a flag indicative of whether a pseudoauthorization is executed. The pseudoauthorization buffer 77 stores card data, an amount of money for purchase (transaction amount), and a pseudoauthorization number whenever a pseudoauthorization processing is executed.

FIGS. 5a, 5b and 6 are flowcharts for assistance in explaining the operation of the present invention, in which FIGS. 5a and 5b show the entire card authorization processing and FIG. 6 shows pseudoauthorization data forming operation.

The operation of an embodiment of the present invention will be described hereinbelow with reference to these flowcharts.

When a customer wants to pay with a credit card in a store, a store operator receives a credit card from the customer and inserts the card into the card reader 2 of the CAT 1. The card reader 2 reads card data from the inserted card and supplies the read card data to the CPU 8 (in step S1). The CPU 8 stores the card data in a predetermined area (not shown) of the RAM 7. Thereafter, when the operator depresses the numeral keys 32 of the keyboard 3 to enter an amount of money for purchase (transaction amount), the CPU 8 stores the entered transaction amount data in a predetermined area (not shown) of the RAM 7 (in step S2). The CPU 8 discriminates whether the entered transaction amount data is an authorization processing limit or less, which is stored in the limit amount buffer 71 (in step S3). In this embodiment, as described above, since the transaction amount of money is not compared with the limit amount by the operator, it is possible to eliminate operator's error as in the prior-art CAT.

Here, if the transaction amount of money is an authorization processing limit amount or less, the CPU 8 sets a flag F in the pseudoauthorization processing flag storing area 76 to "1" to execute a pseudoauthorization processing in the succeeding processing (in step S4). The operator depresses any one of the card company selection keys 31 and the dial key 33 (in step S5). The CPU 8 discriminates whether the pseudoauthorization processing flag F is set to "1" (in step S6). If not set to "1", a DC circuit is formed between the CPU 8 and the host computer to call the host computer; that is, data transmission is enabled as in the ordinary telephone handset off-hook condition (in step S7). On the other hand, if the pseudoauthorization processing flag F is "1", since the CPU 8 does not operate as in step S7, the ordinary telephone handset on-hook condition is maintained. The CPU 8 effects dialing irrespective of on-hook an off-hook condition (in step S8) and transmits card data and transaction amount data stored in the RAM 7 to the host computer via the MODEM 5 (in step S9). However, it goes without saying that no data are transmitted under on-hook condition.

Seccessively, the CPU 8 discriminates whether the pseudoauthorization processing flag F is set to "1" (in step S10). If not set to "1"; that is, when an authorization processing by the host computer is being executed, the CPU 8 receives response data from the host computer, that is, the authorization results (in step S11) and stores the response data in the display buffer 75 (in step S12). Thereafter, the CPU 8 discriminates whether data are stored in the pseudoauthorization buffer 77 (in step S13). When data are stored in the pseudoauthorization buffer 77, the CPU 8 reads data from the pseudoauthorization buffer 77 and transmits the data to the host computer (in step S14). After all the data have been transmitted, the CPU 8 clears the pseudoauthorization buffer 77 (in step S15) and disconnects the telephone line (in step S16). When the CPU 8 discriminates that no data are stored in the pseudoauthorization buffer 77 (in step S13), the CPU 8 skips the steps S14 and S15 to the step S16. Finally the authorization results stored in the display buffer 75 are shown on the display device 4 (in step S17).

On the other hand, when the CPU 8 discriminates that the pseudoauthorization processing flag F is set to "1" (in step S10), the CPU 8 form pseudoauthorization response data (in step S18), In this pseudoauthorization response data formation processing, as shown in FIG. 6, the CPU 8 first generates a random number and stores it in the arithmetic buffer 74 (in step S181). The CPU 8 reads an authorization number data used for the preceding pseudoauthorization processing and stored in the authorization number buffer 72, and adds the read data to the random number stored in the arithmetic buffer 74 to form a new current pseudoauthorization number date (in step S182). Here, the reason why the current pseudoauthorization number is formed by adding a random number to the preceding pseudoauthorization number is to allow the operator not to notice that a pseudoauthorization is being executed. The CPU 8 forms a pseudoauthorization response data on the basis of pseudoauthorization message data stored in the message buffer 73 and the current pseudoauthorization number data stored in the arithmetic buffer 74 (in step S183).

Seccessively, the CPU 8 stores the pseudoauthorization response data in the display buffer 75 (in step S19 shown in FIG. 5b), and stores card data, transaction amount data and pseudoauthorization number data used for pseudoauthorization transaction in the pseudoauthorization buffer 77 (in step S20). The CPU 8 stands-by a predetermined time to correct a time difference in actual authorization processing with the host computer and this pseudoauthorization processing (in step S21). The CPU 8 displays the pseudoauthorization response data stored in the display buffer 75 on the display device 4 and updates the pseudoauthorization number data in the authorization number buffer 72 with the current pseudoauthorization number, while clearing the arithmetic buffer 74 and resetting the pseudoauthorization flag F (in step S17).

Another embodiment of the present invention will be described hereinbelow with reference to FIGS. 7, 8a, and 8b. The system configuration shown in FIGS. 1, 2 and 3 and the operation flowchart shown in FIG. 6 are also applicable to this embodiment. The memory configuration shown in FIG. 7 corresponds to that shown in FIG. 4, the same portions being designated by the same reference numerals. Further, the flowchart shown in FIGS. 8a and 8b corresponds to that shown in FIGS. 5a and 5b, the same processing steps being designated by the same reference step numerals.

In the afore-mentioned first embodiment, an actual authorization processing by the host computer is executed only when an amount of money for customer's purchase is more than a predetermined limit amount. In this second embodiment, however, there exist cases where the actual authorization processing is executed even when the amount of money is a predetermined limit amount or less. The pseudoauthorization processing is executed only when an amount of money for the customer's purchase is a predetermined limit amount or less and further the host computer does not execute an actual authorization processing.

Figure 7:
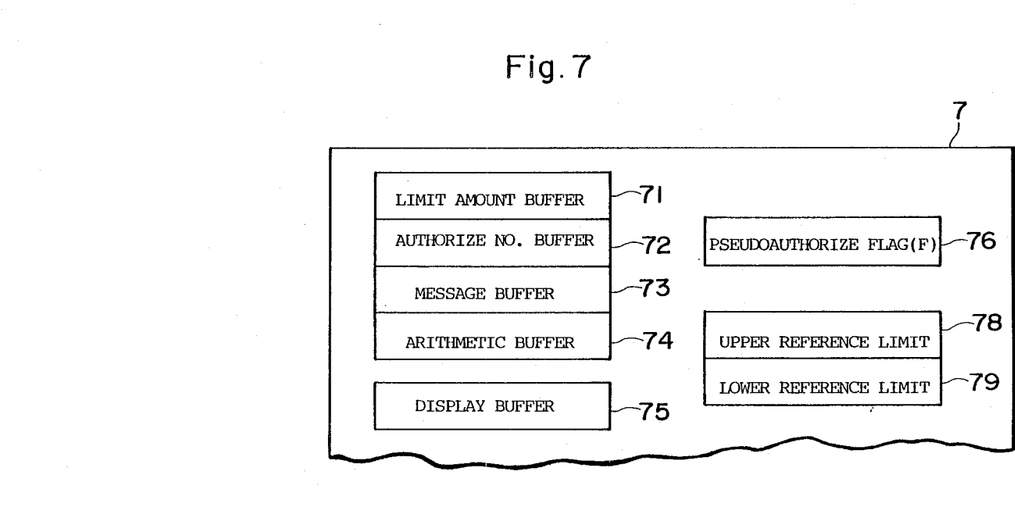
FIG. 7 is a view for assistance is explaining a RAM memory configuration of another embodiment.

In FIG. 7, the RAM 7 is further provided with an upper reference limit storing area 78 and a lower reference limit storing area 79. An upper limit of the reference value based on which it is determined whether an authorization processing request is transmitted to the host computer is stored in the upper reference limit storing area 78, while a lower limit of the reference value is stored in the lower reference limit storing area 79. Here, when an amount of money for customer's purchase is a limit amount stored in the limit amount buffer 71 or less, the CPU 8 generates a random number. When this random number lies within a range between the upper and lower limit values, the CPU 8 controls the system so that a pseudoauthorization is executed. In contract with this, when this random number lies out of this range, the CPU 8 controls the system so that an authorization request is transmitted to the host computer.

Figure 8A:
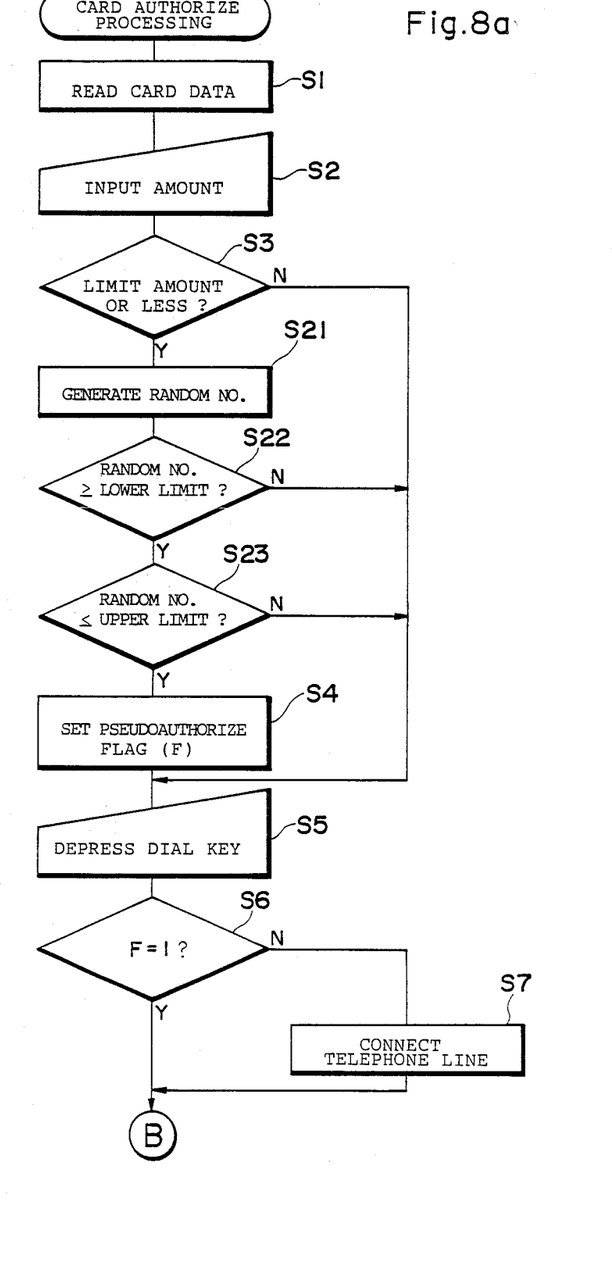
FIGS. 8a and 8b are flowcharts, similar to FIGS. 5a and 5b, for assistance in explaining the operation of the another embodiment of the present invention.
Figure 8B:
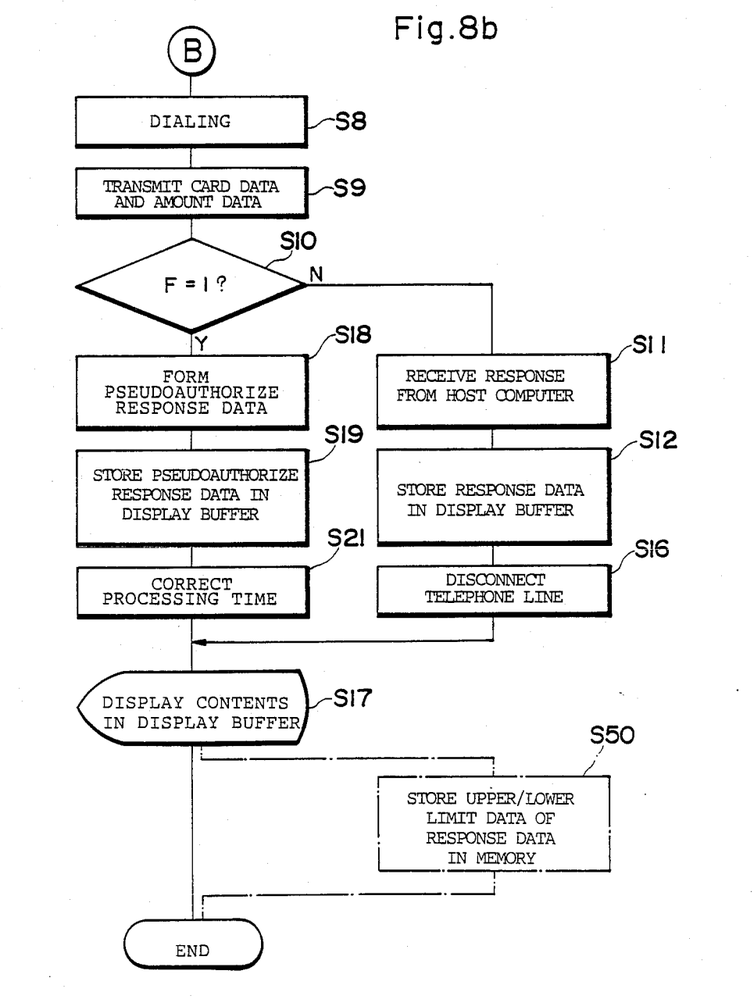

In comparison of FIGS. 8a and 8b with FIGS. 5a and 5b, processing steps S21 to S23 are additionally provided between the processing steps S3 and S4. The CPU 8 discriminates whether the inputted transaction amount data is an authorization processing limit amount stored in the limit amount buffer 71 or less (in step S3). If the transaction amount is the limit amount or less, the CPU 8 generates a random number (in step S21), discriminates whether the random number is the lower reference limit stored in the lower reference limit storing area 79 or more (in step S22), and further discriminates whether the random number is the upper reference limit stored in the upper reference limit storing area 78 or less (in step S23). When the random number lies between the upper and lower reference limits, the CPU 8 sets the flag F in the pseudoauthorization processing flag area 76 to "1" in order to execute a pseudoauthorization processing in the succeeding processing (in step S4). When the random number generated by the CPU 8 lies out of these range between the upper and lower reference limits, the pseudoauthorization processing flag F is kept reset. Here, when the CPU 8 discriminates that the customer's purchase amount data is more than the authorization processing limit amount data (in step S3), the above-mentioned steps S21 to S23 and the step S4 are skipped.

As described above, in this embodiment, when the customer's purchase amount (transaction amount) data is the limit amount on which an authorization processing by the host computer is required or less, since a random number is generated and the authorization processing by the host computer is executed at random, even if the limit amount is known, it is very difficult to use cards illegally, while giving the operators or customers a recognition that it is impossible to use cards illegally, thus preventing crimes related to cards.

Further, in the above embodiment, although the CPU 8 generates a random number simply, it is also possible to generate a random number by substituting the purchase amount data inputted by the numeral keys 32 or a card data read by the card reader 2 or both into a predetermined function.

The other processing steps after step S5 are the same as those explained with reference to FIGS. 5a and 5b. However, in FIG. 8b, the steps S20, S13 to S15 are omitted. In this embodiment, it is of course possible to provide the pseudoauthorization buffer 77 in the RAM 7 as in FIG. 4 in order that the pseudoauthorization transaction data stored in this buffer 77 can be transmitted to the host computer when the system is connected to the host computer in response to an authorization request to the host computer.

Further the above embodiment, an authorization processing request to the host computer is determined on the basis of whether the generated random number lies within a predetermined range. Without being limited thereto, however, it is also possible to determine whether an authorization processing request is transmitted to the host computer on the basis of whether the generated random number is an even number or an odd number.

In the above embodiment, upper and lower limits of the reference data can be set through the keyboard 3 of the CAT 1. When the range between the two upper and lower limits is determined to be narrow, the number of transactions to which the pseudoauthorization processing is executed decreases, and therefore the authorization processing is executed to almost all transactions in dependence upon communications with the host computer so that the number of communications with the host computer increases. In contrast with this, when the range between the two upper and lower limits is widened, there exists a problem in that the rate of transactions to which actual authorization is executed decreases, so that there exists less significance that an actual authorization is executed to some low-amount transactions extracted at random.

In addition, it is not necessarily preferable that operators or managers of the stores at which the CAT is equipped can easily determine the upper and lower limits.

To overcome these problems, another embodiment in which the upper and lower limits can be determined on the host computer side will be described hereinbelow with reference to FIG. 9 and FIGS. 10a and 10b. In this embodiment, the system configuration shown in FIGS. 1, 2 and 3 and the flowcharts shown in FIGS. 6, 8a and 8b can be applied thereto.

Figure 9:
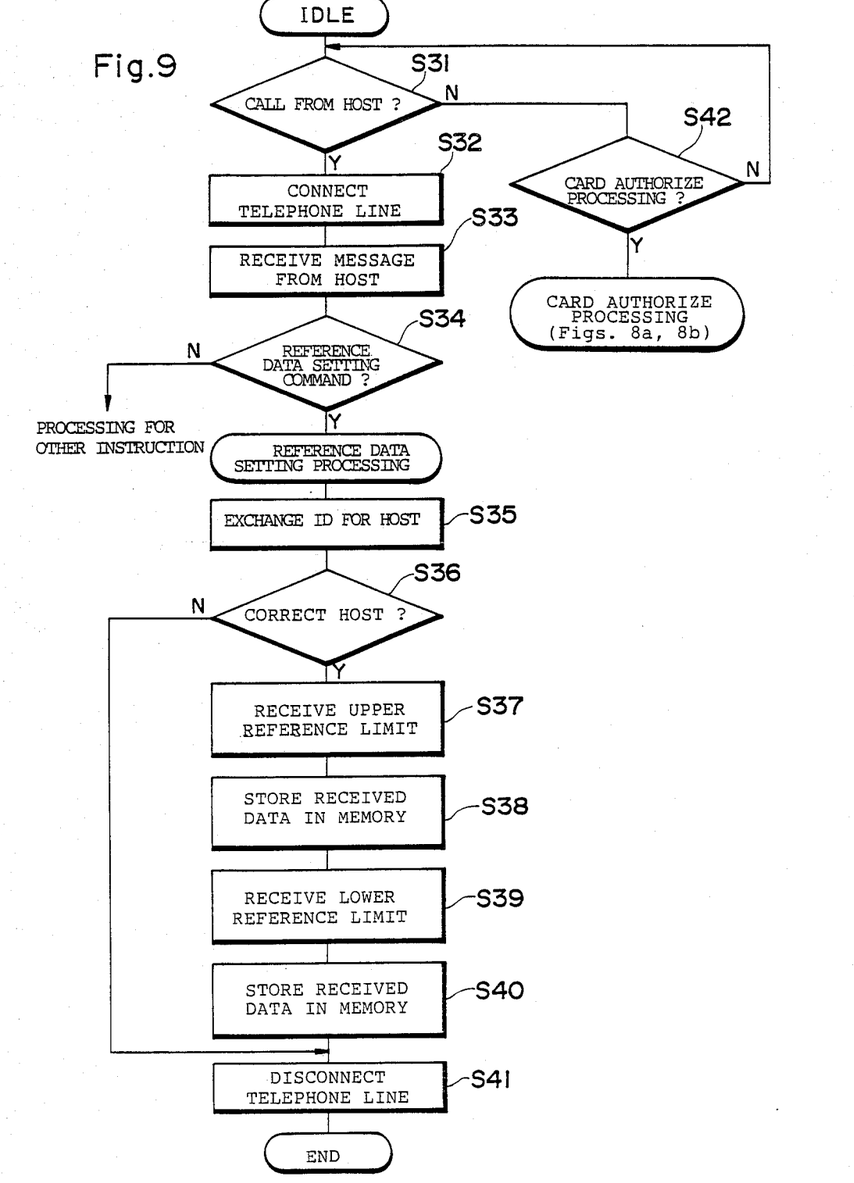
FIG. 9 is a flowchart for assistance in explaining a communications processing between the card authorization terminal of further another embodiment of the present invention and a host computer.

With reference to FIG. 9, when the power supply is turned on, the CAT 1 stands-by a calling from the host computer via the transmission line (in step S31) or a setting to the card authorization processing mode determined by the input from keyboard 3 under idling conditions (in step S42).

Under these conditions, when a card authorization processing mode is set by depressing a key of the keyboard 3 (YES in step S42), the card authorization processing shown in FIGS. 8a and 8b starts.

When there exists a call from a host computer via the transmission line during idling operation (YES in step S31), the CPU connects the telephone line thereto (in step S32) and receives a message from the host computer (in step S33). This received message includes various instructions to the CAT 1, so that the CPU executes various tasks in accordance with these instruction commands.

When a reference value setting command of these instruction commands is received (YES in step S34), the reference value (data) setting processing starts. Upon start of this reference data setting processing, an ID is exchanged between the CAT and the host computer (in step S35). After the host computer has been determined to be correct (in step S36), the CPU receives an upper and lower limits of the reference data on the basis of a format command shown in FIG. 10a, and stores these two limit values in the upper limit buffer 78 and the lower limit buffer 79 of the memory 7, respectively (in steps S37 to S40), and disconnects the telephone line (in step S41), thus completing the reference data setting processing.

Figure 10A:
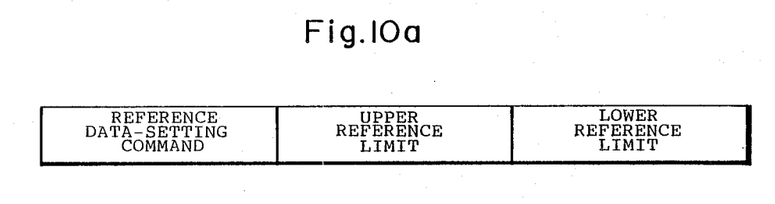
FIGS. 10a and 10b are views showing data formats of received data in the card authorization terminal of the further another embodiment.
Figure 10B:
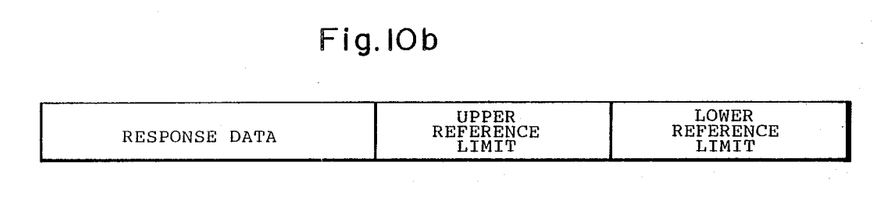

As described above, in this embodiment, the upper and lower reference data limits are automatically set to the CAT 1 by transmitting a reference data setting command and the upper and lower reference data limits as shown in FIG. 10a from the host computer.

In this embodiment, it should be noted that it is impossible to determine or change the upper and lower reference data limits by depressing keys on the keyboards 3. In other words, it is impossible to determine the upper an lower reference data limits except by the host computer via transmission line, so that the operator or the store manager cannot know the upper and lower limits. Therefore, it is possible to give a psychological effect to customers and operators that an illegal card purchase based upon pseudoauthorization is impossible.

In the present embodiment, in addition, since the reference data can be adjusted for each store in accordance with the evaluation degree of transaction credit determined when seen from the card company; that is, the frequency of actual authorization processing can be controlled, it is possible to effectively use the host computer by reducing the frequency of card authorization inquiries.

Further, it is possible to continuously check the credit evaluation degree of each store on the basis of the proportion of actual authorization processing determined for each store, erroneous card processing, the number of card-related crimes, etc., thus it being possible to prevent criminal transactions based upon credit cards.

Further, in the above embodiment, the upper and lower reference data limits are transmitted together with the reference data determining commands as shown in FIG. 10a and received by the CAT 1. Without being limited thereto, however, it is possible to set data from the host computer by adding the upper and lower reference data limits to the response data from the host computer as shown in FIG. 10b and by receiving these during the response processing from the host computer as shown in FIG. 8 (in step S11) and by storing the upper and lower reference data limits included in the response data in the memory (as shown by dot-dashed lines in FIG. 8b, in step S50). In this case, since the upper and lower data limits can be changed according to respective authorization results, there exists an effect that it is possible to appropriately determine the frequency of actual authorization processing according to the frequency of occurrence of illegal card processing at each store.

I claim:

1. A card authorization terminal, comprising:
 (a) reading means for reading card data;
 (b) inputting means for inputting transaction amount data;
 (c) authorization processing means for transmitting card data read by said reading means and transaction amount data inputted by said inputting means to a host computer for authorization request and by receiving and displaying authorization results transmitted from the host computer, when the transaction amount data inputted by said inputting means satisfies authorization requirement conditions;
 (d) pseudoauthorization processing means for effecting a pretended authorization processing by displaying predetermined pseudoauthorization results without transmitting an authorization request to the host computer, when the transaction amount data inputted by said inputting means satisfies pseudoauthorization conditions;
 (e) storing means for storing card data read by said reading means and transaction amount data inputted by said inputting means whenever a pseudoauthorization processing is effected by said pseudoauthorization processing means;
 (f) detecting means for detecting whether card data and transaction amount data are stored in said storing means; and
 (g) controlling means for allowing said detecting means to detect whether card data and transaction amount data are stored in said storing means when an authorization processing is effected by said authorization processing means, and for transmitting data stored in said storing means to the host computer, without interrupting communications after an authorization processing by said authorization processing means, when data storage is detected by said detecting means.

2. The card authorization terminal of claim 1, wherein the authorization requirement condition is that transaction amount data is more than a predetermined limit amount, and the pseudoauthorization condition is that transaction amount data is the predetermined limit amount or less.

3. The card authorization terminal of claim 1, which further comprises extracting means for extracting at random some transactions to be processed by said authorization processing means from transactions whose transaction amount satisfies the pseudoauthorization condition.

4. The card authorization terminal of claim 3, which further comprises setting means for setting information related to an extraction rate at which transactions are extracted at random.

5. The card authorization terminal of claim 3, wherein the information related to the extraction rate is transmitted from the host computer.

6. The card authorization terminal of claim 3, wherein said extracting means comprises means for generating a random number when the inputted transaction amount is determined to satisfy the pseudoauthorization condition; and means for selecting whether an authorization processing is requested for the host computer on the basis of the generated random number.

7. A card authorization terminal for effecting an authorization processing by transmitting an authorization request to a host computer and by displaying an authorization result from the host computer when a transaction amount satisfies an authorization requirement condition and for effecting a pseudoauthorization processing by displaying predetermined pseudoauthorization results, without transmitting an authorization request to the host computer, when a transaction amount satisfies a pseudoauthorization condition, which comprises:
 (a) inputting means for inputting transaction amount data;
 (b) discriminating means for discriminating whether a transaction amount data inputted by said inputting means is a limit amount data or less and therefore an authorization processing by the host computer is not required;
 (c) generating means for generating a random number when said discriminating means determines that the transaction amount data inputted by said inputting means is the limit amount data or less;

(d) selecting means for selecting whether an authorization processing is requested to the host computer on the basis of a random number generated by said random number generating means; and (e) controlling means to effect an authorization processing with the host computer, without effecting pseudoauthorization processing, when said discriminating means determines that a transaction amount data inputted by said inputting means is the limit amount data or less and further said selecting means selects an authorization processing by the host computer.

8. The card authorization terminal of claim 8, wherein said random number generating means fomrs a random number on the basis of transaction amount data inputted by said inputting means.

9. The card authorization terminal of claim 8, which further comprises reading means for reading card data from a card, said random number generating means forming a random number on the basis of card data read by said reading means.

10. The card authorization terminal of claim 8, which further comprises reading means for reading card data from a card, said random number generating means forming a random number on the basis of card data read by said reading means and transaction amount data inputted by said inputted means.

11. The card authorization terminal of claim 8, wherein said selecting means selects whether an authorization processing is to be requested to the host computer on the basis of whether a random number formed by said random number generating means lies within a predetermined range.

12. The card authorization terminal of claim 8, wherein said selecting means selects whether an authorization processing is to be requested to the host computer on the basis of whether a random number formed by said random number generating means is an even number or an odd number.

13. A card authorization terminal for effecting an actual authorization processing, in communications with a host computer, for transactions of a small amount of money of an authorization processing limit amount or less which are extracted at random in accordance with a predetermined extraction rate, and for effecting a pseudoauthorization processing, without communication with the host computer, for transactions not extracted, which comprises:

(a) means for detecting information related to the extraction rate from data received from the host computer via a transmission line; and (b) means for automatically updating the extraction rate on the basis of information detected by said detecting means, whereby the extraction rates can be determined via the transmission line only from outside.

* * * * *